E. H. TARTRAIS.
PACKING FOR SLIDE VALVES.
APPLICATION FILED AUG. 22, 1911.
1,031,973.
Patented July 9, 1912.
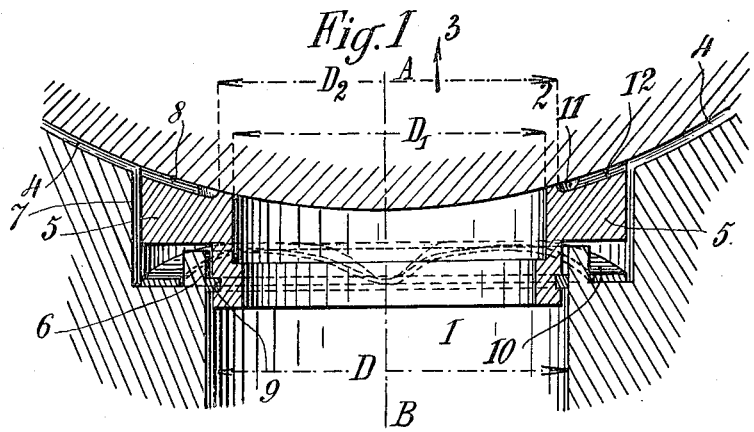
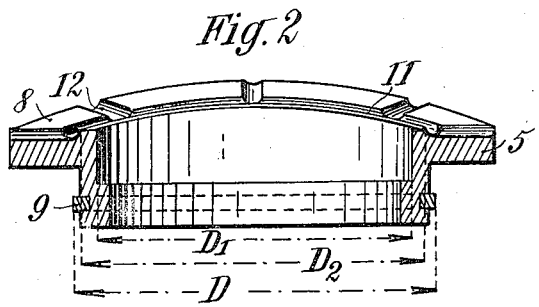
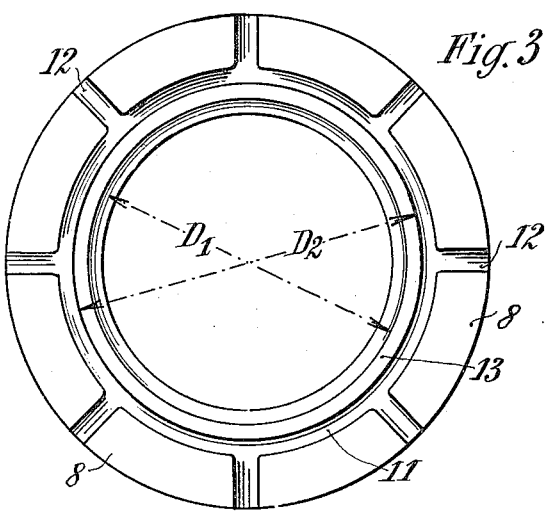
Witnesses:
H. F. Rueth.
C. D. Swett.
Inventor:
E. H. Tartrais
By F. Dittmar
Attorney.

UNITED STATES PATENT OFFICE.

EUGÈNE HENRI TARTRAIS, OF MONTMORENCY, FRANCE.

PACKING FOR SLIDE-VALVES.

1,031,973.  Specification of Letters Patent.  Patented July 9, 1912.

Application filed August 22, 1911. Serial No. 645,361.

*To all whom it may concern:*

Be it known that I, EUGÈNE HENRI TARTRAIS, a citizen of the French Republic, residing at 32 Rue des Chesneaux, Montmorency, Seine-et-Oise, France, have invented a certain new and useful Improvement in Hermetic Packings for the Slide-Valves of Internal-Combustion Engines, of which the following is a specification, such as will enable others skilled in the art to which it appertains to make and use the same.

This invention has reference to a packing for the slide valves of internal combustion engines occasioning but slight friction and consequently enabling them to work at high temperatures which renders the lubrication difficult, absorbing but little power in spite of the high sliding velocities that can be attained.

According to the invention the packing is formed by a ring pressed by a spring against the surface of the slide valve and arranged in a pipe communicating with the cylinder and is provided on this side with an auxiliary packing, preferably formed of an expanding split ring, and in which the dimensions of the ring are such that the surface on which the pressure of the gas acts for thrusting it against the slide valve is relatively small with respect to the friction surface of the ring on the slide valve. Furthermore in order to prevent any counter-pressure being produced that would tend to move the ring away from the slide valve, a deep groove with exhaust channels is formed in the surface of the ring pressing against the slide valve for the purpose of expanding the practically unavoidable slight escape of gas.

In the drawings:—Figure 1 is a cross section of the slide valve. Fig. 2 is a section along the line A—B of the packing ring. Fig. 3 is a plan view of the said ring showing its frictional surface.

1 is the cylinder of the engine or a cylindrical pipe communicating with this cylinder.

2 is the slide valve which in this case is supposed to be cylindrical and which is moved along or around its axis 3. The ports of this slide valve are not shown, the distributing phases not being concerned in the present invention. In the position shown the cylinder is closed by the slide valve and the engine is consequently in the cycle of compression or in the working cycle.

The slide valve by itself would permit of leakage, a certain clearance existing at 4, the minimum amount of which is determined by the necessity of permitting the expansion of the said slide valve. The packing is formed by a ring 5 which engages in the pipe 1 with slight clearance at 6 and 7, so as to permit of expansions and which on the other hand rests exactly with its surface 8 against the slide valve. The existence of clearance at 6 renders it advisable to employ a packing at this spot. In the drawing for the sake of example an expanding ring 9 is shown working as a piston packing ring. A spring of any desired shape, shown in the drawing as an undulated washer 10, rests on the body of the cylinder and tends to thrust the packing ring against the slide valve.

At 11 a deep groove is formed passing right around the packing ring and communicating with the atmosphere, by means of radial grooves 12. The object of this arrangement is as follows:—A slight leakage tends to be produced between the packing surfaces of the ring 5 and the slide valve 2, because practically the packing surfaces can never be sufficiently perfect to prevent it, the more so as the spring 10 is very weak, this being intentionally the case for the purpose of attenuating any friction. However little this leakage may be (considered from the standpoint of the loss of gas), it nevertheless occasions pressure between the contact surfaces of the packing ring and of the slide valve, which if the above-mentioned arrangement of grooves were not provided, would tend to move the ring away from the slide valve, the more so as the surface of the packing ring is, for the purpose of attenuating the load per unit of supporting surface, intentionally relatively large, with respect to the annular surface limited by the circumferences of diameters D and $D^1$ which receives the oppositely directed thrust. The presence of the groove 11 is for the purpose of expanding this leakage gas from the inner edge of the said groove, so that the counter-pressure is only occasioned in the portion 13, comprised between the inner edge of the ring and the inner edge of the deep groove 11. The suitable dimensions of the diameters D, $D^1$ and $D^2$ can be obtained experimentally, and may be such that the packing is practically balanced for certain conditions of gas pressure, of spring power and of adjustability; this limit need not be attained and by making $D^2$ smaller than D there will always exist an excedent pressure tending to thrust the ring 5 against the slide valve.

The preceding description is given for the sake of example, but various modifications can be introduced without in any way modifying the fundamental principle of the invention. The slide valve instead of being cylindrical may be of any desired shape such as conical, spherical, plane and the like, the packing ring being correspondingly adapted to it. Furthermore the slide valve may be fixed and the cylinders movable. The grooves 12 may be radial or oblique, or be substituted by any pipe fulfilling the purpose prosecuted, that is to say of connecting the deep groove 11 with the atmosphere. In certain cases the groove 11 need not be continuous, so as to comply with certain requirements of the distribution. A judicious determination of the surfaces will in this case compensate the resulting disadvantage. In certain cases the clearance 4 may be considerably increased and will no longer constitute a clearance, but a large free gap. The same applies to the clearance 7. In certain cases and more particularly when employing metals having a low coefficient of expansion the clearance 6 may be reduced to a practically zero value and will thus permit of dispensing with the auxiliary packing 9.

What I claim and desire to secure by Letters Patent is:—

1. A packing for valves of internal combustion engines comprising a pipe communicating with the cylinder, a ring having a friction surface disposed in said pipe, a valve contacting with the friction surface of said ring, a resilient member pressing said ring against the surface of said valve, an annular groove in said ring and vents connecting said groove with the outer air.

2. A packing for valves of internal combustion engines comprising a pipe communicating with the cylinder, a ring 5 having a friction surface disposed in said pipe and having a side groove and a surface groove, a valve contacting with the friction surface of said ring, an undulating spring pressing said ring against the surface of said valve, an expanding ring in the side groove of said ring 5, and means to connect the surface groove of said ring 5 with the outer air.

In witness whereof I have hereunto set my hand in presence of two witness.

EUGÈNE HENRI TARTRAIS.

Witnesses:
 CHARLES BLONDEL,
 H. C. COXE.

---

Copies of this patent may be obtained for five cents each, by addressing the "Commissioner of Patents, Washington, D. C."